United States Patent
Lindblade et al.

(10) Patent No.: US 10,183,727 B1
(45) Date of Patent: Jan. 22, 2019

(54) IN-SITU TURRET BEARING REPAIR AND ASSEMBLY

(71) Applicant: SOFEC, Inc., Houston, TX (US)

(72) Inventors: Stephen P. Lindblade, Waller, TX (US); Miles A. Hobdy, Richmond, TX (US); David M. Seaman, Waller, TX (US)

(73) Assignee: SOFEC, Inc., Houston, TX (US)

( * ) Notice: Subject to any disclaimer, the term of this patent is extended or adjusted under 35 U.S.C. 154(b) by 0 days.

(21) Appl. No.: 15/725,016

(22) Filed: Oct. 4, 2017

(51) Int. Cl.
| | |
|---|---|
| B63B 9/00 | (2006.01) |
| B63B 21/50 | (2006.01) |
| B63B 35/44 | (2006.01) |
| B23P 15/00 | (2006.01) |
| F16C 43/04 | (2006.01) |
| F16C 19/38 | (2006.01) |

(52) U.S. Cl.
CPC ............. *B63B 9/00* (2013.01); *B23P 15/003* (2013.01); *B63B 21/507* (2013.01); *B63B 35/4413* (2013.01); *F16C 19/38* (2013.01); *F16C 43/04* (2013.01); *B63B 2009/008* (2013.01); *B63B 2035/448* (2013.01); *F16C 2350/00* (2013.01)

(58) Field of Classification Search
CPC ......... B63B 21/00; B63B 22/02; B63B 21/50; B63B 21/507; F16C 21/00
USPC .......... 114/230.12, 230.13, 230.15; 384/127; 441/3, 5
See application file for complete search history.

(56) References Cited

U.S. PATENT DOCUMENTS

| | | | |
|---|---|---|---|
| 5,356,321 A | 10/1994 | Boatman et al. | |
| 5,372,531 A | 12/1994 | Boatman et al. | |
| 5,515,804 A | 5/1996 | Pollack | |
| 5,746,148 A * | 5/1998 | Delago | B63B 21/507 114/230.12 |
| 5,860,382 A | 1/1999 | Hobdy | |
| 5,893,784 A | 4/1999 | Boatman | |
| 6,474,252 B1 * | 11/2002 | Delago | B63B 21/507 114/230.12 |
| 6,477,974 B2 | 11/2002 | Hobdy | |
| 6,990,917 B2 | 1/2006 | Boatman et al. | |
| 7,063,032 B2 | 6/2006 | Lindblade et al. | |
| 7,347,156 B2 | 3/2008 | Lindblade | |
| 7,451,718 B2 | 11/2008 | Boatman et al. | |
| 8,197,293 B2 | 6/2012 | Gooijer et al. | |
| 8,671,864 B2 | 3/2014 | Lindblade et al. | |

(Continued)

*Primary Examiner* — Lars A Olson
(74) *Attorney, Agent, or Firm* — Bracewell LLP; Douglas W. Rommelmann

(57) ABSTRACT

In an offshore system having a floating vessel, a turret within a hull opening, and a bearing assembly including a support row assembly axially transferring the weight of the turret to the vessel and allowing the vessel to weather vane about the turret, a method and arrangement for in situ remediation of a damaged support row assembly. An outer upper ring is removed from an outer lower ring and a support ring is installed on the outer lower ring. A lower race and support rollers of a remedial support row assembly are installed on the support ring. A reaction ring is positioned above the support ring and connected to an inner ring secured to the turret. The inner ring is axially displaced relative to the outer lower ring and the turret axial loading is transferred to the remedial support row assembly between the support ring and the reaction ring.

27 Claims, 5 Drawing Sheets

(56) References Cited

U.S. PATENT DOCUMENTS 8,950,349 B2    2/2015    Lindblade et al.
9,334,902 B2    5/2016    Hooper

* cited by examiner

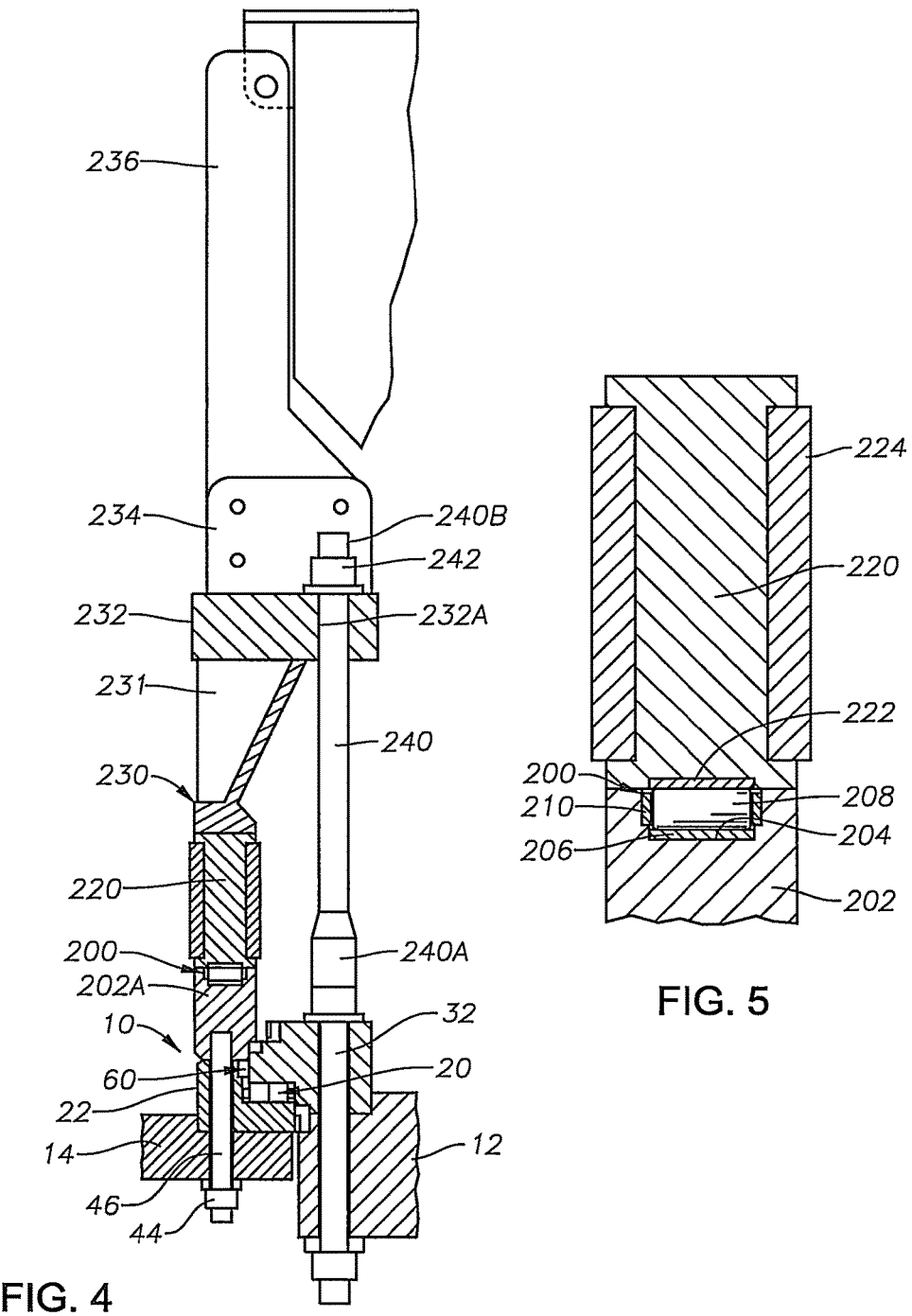

IN-SITU TURRET BEARING REPAIR AND ASSEMBLY

BACKGROUND OF THE INVENTION

1. Field of the Invention

This invention relates to a turret structure for vessels such as offshore drilling or production vessels, and more particularly to a turret bearing assembly and bearing repair procedure that can be performed in situ.

2. Description of the Related Art

Vessel mooring systems are known in the art in which a vessel may weather vane about a turret that is moored to the sea floor. The turret extends through a moon pool or cylindrical opening that extends through the hull of the vessel. The vessel is supported for rotation with respect to the turret by turret bearing structures placed between the turret and the vessel. Horizontal and vertical bearings transfer horizontal and vertical loads between the turret and the vessel.

U.S. Pat. No. 8,671,864, issued on Mar. 18, 2014, in the names of Lindblade et al., discloses such a turret mooring system. FIG. 1 of the '864 patent discloses a bow of a vessel having a moon pool extending through the vessel hull. Mounted within the moon pool is a turret about which the vessel weather vanes. The moon pool is normally of a circular cross-section, and the turret is typically of a cylindrical shape to fit within the moon pool. Anchor legs are connected to the turret and secured to the sea bed by suitable anchors to restrict rotation of the turret. Risers extend from subsea wellheads or distribution facilities on the sea floor and are connected to the turret. A manifold deck is supported on the upper end of the turret and includes valves connected to the risers. A swivel stack extends upwardly from the turret and manifold deck, and allows fluids to be transferred from the turret to the vessel. The turret is supported on the vessel by a turret bearing assembly.

One type of turret bearing assembly commonly used is an integrated three-row roller bearing assembly as shown and described in U.S. Pat. No. 5,893,784, issued on Apr. 13, 1999 to Boatman. The three-row roller bearing assembly includes a circular array of support rollers radially aligned about the turret for supporting the turret weight. Any uplifting turret force is resisted by a second set of radially aligned rollers. A third set of rollers, coaxially aligned about the turret, serves to transfer radial loads between the vessel and the turret. The three bearing rows of the three-row roller bearing assembly are preferably lubricated and sealed within a common volume by seals to provide protection from the elements and prevent corrosion. The integrated three-row roller bearing assembly is a precise assembly that requires a high degree of flatness for proper load distribution and is somewhat intolerant of distortions and deflections, which cause high point loading stresses on select rollers.

Most three-row roller bearing assemblies on turret systems located offshore are not replaceable or repairable in-situ due to factors such as the size, weight and access to the various components. Although these bearing assemblies are designed for the life of the system, if they fail or exhibit problems, no design or method exists to correct major problems on location. Since large vertical loads are always on the bearing support row, this is where wear problems are most likely to occur.

U.S. Pat. No. 8,197,293, assigned to Bluewater Energy Services B.V., discloses initially installing a secondary bearing assembly in place and loading the secondary bearing assembly when the primary bearing assembly no longer functions. One drawback to this is that including two bearing assemblies (one as a spare) is cost prohibitive and adversely affects capital expense.

It would be desirable to be able to replace or repair a damaged turret three-row roller bearing assembly in situ. It would also be desirable to be able to replace or repair a damaged turret three-row roller bearing assembly while the vessel stays on station. It would be desirable to be able to remove the large vertical load from the existing bearing support row and allow the vessel to stay on station. It would be desirable to be able to provide a new vertical load path in situ while allowing the vessel to weather vane about the turret.

SUMMARY OF THE INVENTION

The invention provides a repair to a turret bearing assembly with damaged support row rollers and/or support race. The repair can be performed and assembled in-situ offshore and transfers the load off the main turret bearing's support race and onto a new replacement race in a single lift sequence, thereby simplifying the operation and minimizing the timeframe to perform the load transfer. Additionally, the arrangement removes the need to uninstall the vessel from its offshore location to perform remedial work on the damaged bearing assembly, thereby relieving the vessel's owner of considerable risk and cost implications.

The invention has the goal of removing axial load from an in place damaged three-row roller bearing assembly and allow the vessel to continue to weather vane in either a free-state or with assistance. The invention removes load from the existing bearing support row. Radial load will continue to be transferred through the main bearing, although it is possible to incorporate a radial bearing arrangement if the need were to arise.

BRIEF DESCRIPTION OF THE SEVERAL VIEWS OF THE DRAWINGS

The invention is better understood by reading the detailed description of embodiments which follow and by examining the accompanying drawings, in which:

FIG. 4 is an elevation view in cross-section of repaired three-row roller bearing assembly arrangement according to the preferred embodiment of the present invention;

FIG. 5 is an enlarged view in cross-section of the replacement support roller bearing arrangement of FIG. 4.

DESCRIPTION OF THE PREFERRED EMBODIMENTS

Figure 1:
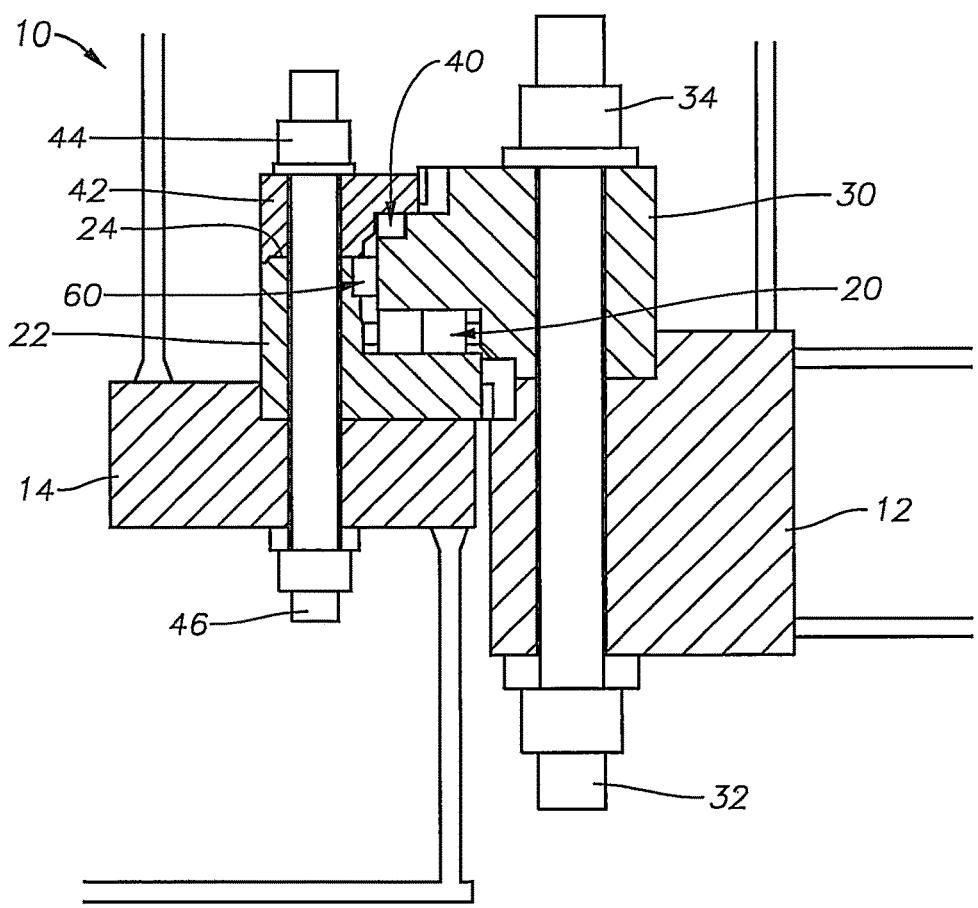
FIG. 1 is a partial elevation view in cross-section of a prior art integrated three-row roller bearing assembly for rotatively coupling a turret within a moon pool of a vessel, showing upper and lower arrangements of radially aligned rollers for transferring axial forces and a mid co-axial arrangement of rollers for transferring radial loads all collocated within a single sealed, lubricated volume.

FIG. 1 depicts a cross-sectional view of a typical three race roller bearing assembly 10 presently found in use on many turret systems. In this system, the turret has a single three race roller bearing assembly 10 installed to react all loading acting between the turret and turret supporting structure 14 of a floating vessel. It is to be understood that the turret supporting structure 14 is part of the floating vessel and has no movement relative to the floating vessel. The turret, represented by turret structure 12, is geostationary and the floating vessel (including the turret supporting structure 14) is allowed to weather vane about the geostationary turret. The bearing assembly 10 is the only means of load transfer across this rotational interface for an external turret, or an internal turret without a lower bearing.

The three-row roller bearing assembly 10 includes a circular array of support rollers with support race and cage, all generally designated as support row assembly 20. The circular array of support rollers are radially aligned about the turret for supporting the turret weight. Any uplifting turret force is resisted by a second set of radially aligned rollers with uplift race and cage, all generally designated as uplift row assembly 40. A third set of rollers with radial race and cage or spacers, all generally designated as radial row assembly 60, coaxially aligned about the turret, serve to transfer radial loads between the vessel and the turret. The third set of rollers for transferring the radial load typically have spacers between the rollers. However, sometimes the bearings are designed full complement, meaning there are no radial cages or spacers and just rollers.

The lower support row assembly 20 is the most loaded when a downwardly acting axial force is applied. Of the three rows of roller bearings, the bearing support rollers and race of the support row assembly 20 typically receive the most load, are the most loaded and the most likely to sustain damage. Thus, the preferred embodiment primarily addresses remediation or replacement of the support race and rollers 20.

The bearing race provides a path on which the rollers roll. To realize the longest service life, the roller path of the bearing race needs to be as flat and round as possible allowing for a smooth load distribution upon the rollers themselves. The present invention uses an existing surface 24 (FIG. 1) within the damaged bearing assembly 10 as a foundation for a replacement bearing support row assembly 200.

Referring to FIG. 1, a bearing inner ring 30 is secured to turret structure 12 via a plurality of circumferentially-spaced fasteners, preferably threaded stud bolts 32 and nuts 34. A bearing outer upper ring 42 and outer lower ring 22 are secured to turret supporting structure 14 of the floating vessel via a plurality of circumferentially-spaced fasteners, preferably threaded stud bolts 46 and nuts 44.

The preferred embodiment of the present invention addresses the in situ repair or remediation of a three-row roller bearing assembly 10 in which the support row assembly 20 is damaged. Preferably, the preferred embodiment is adapted for systems without any uplift load or overturning moment. With reference to FIG. 1, the outer upper ring 42 is removed after removing the outer ring nuts 44 from the plurality of circumferentially-spaced outer ring stud bolts 44. Upon removal of the outer upper ring 42, the upper horizontal surface 24 of the outer lower ring 22 is exposed. This upper horizontal surface 24 becomes the foundation of the new remedial bearing support row assembly 200. Preferably, the exposed row of uplift rollers are removed.

Figure 2:
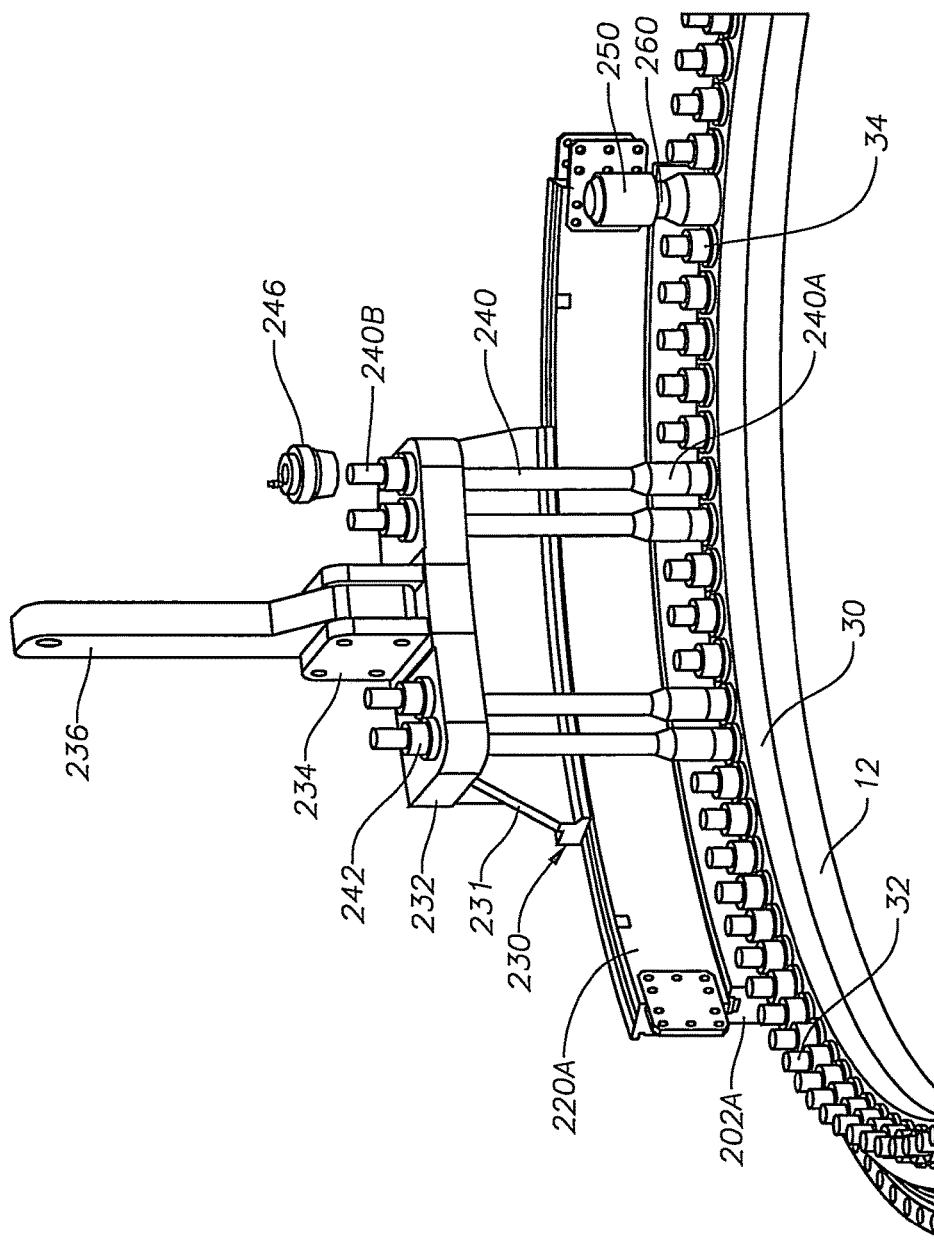
FIG. 2 is a perspective view showing a step in the repair of the three-row roller bearing assembly according to a preferred embodiment, the view showing the repair components from the radially inner portion of the bearing arrangement.
Figure 3:
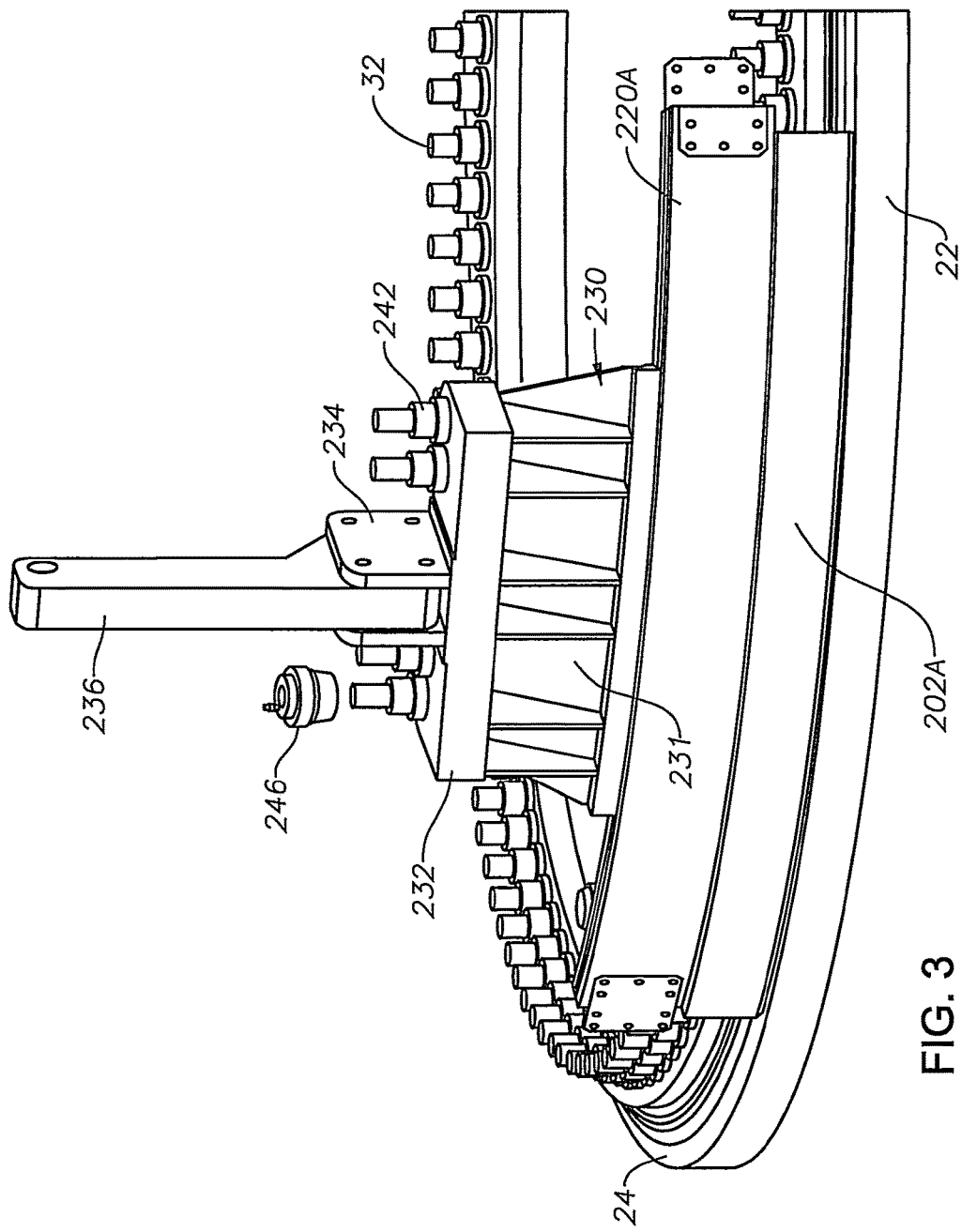
FIG. 3 is a perspective view showing the step and components in the repair as in FIG. 2, but showing the radially outer portion of the bearing arrangement.

FIG. 4 is an elevation view in cross-section of a turret assembly in which the turret has a single three race roller bearing assembly 10 installed to react all loading acting between the turret (geostationary) and vessel's turret supporting structure 14 (weather vane) as described above. FIG. 4 also shows the components required to replace the damaged support row assembly 20 in-situ according to a preferred embodiment of the present invention. FIGS. 2 and 3 also show partial perspective views of the repaired bearing and remediation steps.

Figure 6:
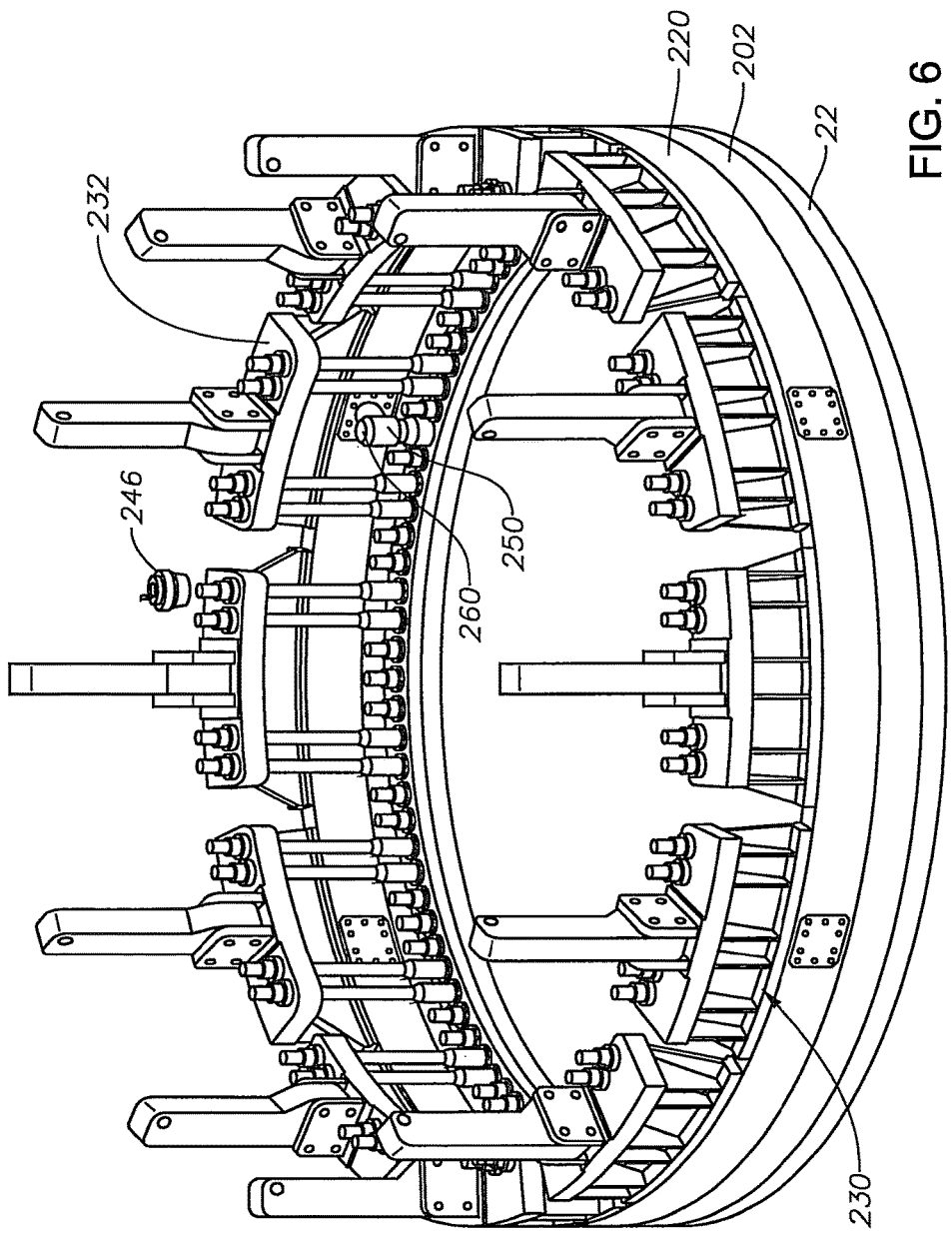
FIG. 6 is perspective view of the repaired three-row roller bearing assembly showing the added circular support ring and reaction ring and the plurality of strongback assemblies.

Referring to FIGS. 2-4, the bearing repair is achieved by installing a circumferential support ring 202 onto the upper horizontal surface 24 of the outer lower ring 22. Preferably, the circumferential support ring 202 comprises a plurality of support ring segments 202A (FIGS. 2 and 3) in abutting relation, each having a generally rectangular cross-section. The support ring 202 is segmented to allow handling and installation at the offshore location. The upper portion of the support ring 202 includes a generally "U" shaped flat bottom channel 204 as shown in FIGS. 4 and 5. Referring to FIG. 4, the segments 202A of the support ring 202 are secured into position on top of the original bearing's outer lower ring 22 using the bearing's existing outer stud bolt pattern. Preferably, the support ring segments 202A include a plurality of threaded blind bores adapted to align with the outer stud bolt pattern such that the outer ring studs 46 and nuts 44 can be used to securely fasten the support ring segments 202A to the outer lower ring 22 and the turret supporting structure 14 of the vessel and form the circumferential support ring 202 as shown in FIG. 6. The installed support ring 202 establishes the new rotating portion (weather vane) for the remedial bearing support row assembly 200.

Referring to FIG. 5, the generally "U" shaped flat bottom channel 204 of the circumferential support ring 202 preferably receives a lower hardened segmented race 206 and a circular array of support rollers 208 in a segmented cage 210. Preferably, the lower hardened race segments 206, cages 210 and support rollers 208 are installed in the channel 204 after the circumferential support ring 202 is assembled. The cage 210 maintains the support rollers 208 in a near fixed position relative to each other, in addition to guiding the support rollers 208 within the channel 204.

A reaction ring 220 is installed above the new support ring 202. Preferably, the reaction ring 220 is divided into segments 220A and assembled into the reaction ring 220 upon being placed on top of the support rollers 208. The reaction ring 220 houses an upper hardened race 222 which bears upon the top of the support rollers 208. This is the new axial load transfer point from the geostationary to the weather vane portion of the turret system. The reaction ring segments 220A are preferably held together with a series of bolted connection plates 224 located at each end of the segments 220A, thereby creating a continuous reaction ring 220.

A plurality of equally-spaced, circumferentially positioned strongback assemblies 230 are located on the top of the reaction ring 220 as shown in FIG. 6. These strongback assemblies 230 are adapted to enable lifting of the geostationary turret portion, thereby removing the load off the damaged rollers of the original support row assembly 20 and immediately transferring it onto the new remedial bearing support row assembly 200. The strongback assembly 230 includes a strongback base 231 positioned on and positively engaging the reaction ring 220. FIGS. 2 and 3 show one of the plurality of strongback assemblies 230 on a reaction ring segment 220A. The strongback base 231 has an upper radial flange plate 232 and a pair of spaced upright plates 234 extending upwardly from the radial flange plate 232. A strongback lever 236, preferably in an upright position, is connected to the spaced upright plates 234 with a series of bolts or pins. Referring to FIG. 4, the lever 236 is slidably connected to the geostationary turret structure 12 and is only capable of reacting radial loads against the turret structure 12.

A plurality of puller bars 240 have a lower end 240A threaded onto the protruding end of the existing bearing's inner ring stud bolts 32 as shown in FIGS. 2 and 3. The puller bars 240 live an upper end 240B passing through holes 232A (FIG. 4) in the thick flange plate 232 of the strongback base 231. The upper end 240B of the puller bars 240 are externally threaded and washers and threaded nuts 242 are installed at the puller bar 240 to flange plate 232 interface. A portion of the upper end 240B of the puller bar 240 protrudes above the nut 242 allowing for a hydraulic jack 246 to be installed for the lifting operation.

Preferably, turret lifting may be accomplished with at least two hydraulic jacks 246 installed at the location of each strongback assembly 230. Preferably, the hydraulic jacks 246 are positioned on both sides of the strongback lever 234. The jacks 246 at all of the strongback locations are simultaneously energized, lifting the turret and immediately transferring the load from the existing damaged support row assembly 20 to the newly installed remedial support row assembly 200. Once the turret's geostationary portion has been lifted a prescribed height above the outer lower ring 22, the nuts 242 on the upper end 240B of the puller bars 240 can be rotated down to their seated position against the flange plate 232. After the nuts 242 have been properly adjusted, the pressure in the hydraulic jacks 246 can be relieved and the axial support load is mechanically supported via the new load path.

As part of the new arrangement, a plurality of torque arms 250 and reaction posts 260 are preferably incorporated for each reaction ring segment 220A to transfer torque between the existing bearing inner ring 30 and the reaction ring 220 as shown in FIG. 2. The reaction post 260 has a lower portion adapted to engage a nut 34 on the inner ring stud bolt 32 and the torque arm 250 engages the radial inner surface of the reaction ring 220, preferably via the connection plate 224. The torque arm 250 includes a vertically oriented sleeve receiving an upper portion of the reaction post 260. The torque arm 250 and reaction post 260 are slidably engaged to allow relative vertical (axial) movement therebetween during the turret lifting procedure. The arm 250 and post 260 are closely fitted in the radial sense as to minimize the relative motions during vessel rotations.

The preferred embodiment of the present invention has the goal of removing axial load from an in place damaged three-row roller bearing assembly while allowing the vessel to continue to weather vane in either a free-state or with assistance.

In a preferred embodiment of the present invention, repair of the damaged bearing assembly is accomplished in the following steps:

1. Partial disassembly of the existing three row roller bearing assembly.
2. Installation of the new bearing support row assembly components.
3. Installation of the hydraulic jacks and strongback assemblies.
4. Turret lifting and load transfer.
5. Securing the axial load onto the new bearing support row assembly.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

We claim:

1. In a three row, roller bearing assembly (10) rotatively coupling a vessel to a turret (12), the three row, roller bearing assembly having a support row assembly (20), a radial row assembly (60) and an uplift row assembly (40) disposed between an inner ring (30) connected to the turret and outer upper and lower rings (42, 22) connected to the vessel, a method for in situ remediation of the damaged support row assembly (20) comprising the steps of:
   removing the outer upper ring from engagement with the outer lower ring;
   installing a circumferential support ring (202) on the outer lower ring;
   installing at least a portion of a remedial support row assembly (200) on the support ring;
   positioning a circumferential reaction ring (220) above the support ring;
   connecting the reaction ring to the inner ring secured to the turret;
   axially displacing the inner ring and turret relative to the outer lower ring and transferring the turret axial loading to the remedial support row assembly between the support ring and the reaction ring; and
   securing the inner ring and turret in the axially displaced position.

2. The method of claim 1, wherein the step of installing a circumferential support ring comprises installing a plurality of support ring segments (202A) in abutting relation.

3. The method of claim 2, wherein the step of installing a plurality of support ring segments in abutting relation comprises fastening the plurality of support ring segments to the outer lower ring secured to the vessel.

4. The method of claim 1, wherein the step of positioning a circumferential reaction ring above the support ring comprises joining a plurality of reaction ring segments (220A) to one another while positioned above the support ring.

5. The method of claim 1, wherein the step of connecting the reaction ring to the inner ring secured to the turret comprises:
   circumferentially positioning a plurality of strongback assemblies (230) on top of the reaction ring; and
   connecting each strongback assembly to the inner ring with a plurality of puller bars (240).

6. The method of claim 5, wherein the step of connecting each strongback assembly to the inner ring with a plurality of puller bars comprises connecting a first end (240A) of each puller bar to a protruding end of an inner ring stud bolt (32) and having a second end (240B) of each puller bar passing through a hole (232A) in the strongback assembly.

7. The method of claim 6, wherein the step of axially displacing the inner ring and turret relative to the outer lower ring and transferring the turret axial loading comprises:
   installing a hydraulic jack (246) at the location of each strongback assembly; and
   simultaneously energizing each of the hydraulic jacks to lift the inner ring and turret relative to the outer lower ring and immediately transferring the turret axial loading from the damaged support bearing (20) to the remedial support row assembly (200).

8. The method of claim 7, wherein each hydraulic jack is connected to the second end of a puller bar.

9. The method of claim 7, wherein the step of securing the inner ring and turret in the axially displaced position comprises adjusting a nut (242) on the second end of each puller bar to a seated position against the strongback assembly.

10. The method of claim 9, further comprising the steps of:
relieving the pressure in the hydraulic jacks; and
removing the hydraulic jacks.

11. The method of claim 5, wherein the step of axially displacing the inner ring and turret relative to the outer lower ring and transferring the turret axial loading comprises:
installing a hydraulic jack (246) at the location of each strongback assembly; and
simultaneously energizing each of the hydraulic jacks to lift the inner ring and turret relative to the outer lower ring and immediately transferring the turret axial loading from the damaged support bearing (20) to the remedial support row assembly (200).

12. In an offshore system including a floating vessel having a turret supporting structure allowed to weather vane about a turret, a mooring structure extending from the turret to the seafloor, and a bearing structure rotatably supporting the turret on the turret supporting structure of the vessel and that includes a support bearing (20) providing vertical load transfer of the turret to the vessel, the support bearing positioned between a bearing inner ring (30) and an outer lower ring (22), wherein an in-situ remedial support bearing arrangement comprises:
a circumferential support ring (202) connected to the outer lower ring secured to the vessel;
a circumferential reaction ring (220) positioned above the support ring;
a remedial support bearing (200) positioned between and separating the support ring and the reaction ring;
a plurality of strongback assemblies (230) abutting a top surface of the reaction ring and connected to the bearing inner ring.

13. The in-situ remedial support bearing arrangement of claim 12, wherein the circumferential support ring comprises a plurality of support ring segments (202A) in abutting relation.

14. The in-situ remedial support bearing arrangement of claim 13, wherein the plurality of support ring segments are fastened to the outer lower ring.

15. The in-situ remedial support bearing arrangement of claim 12, wherein the circumferential reaction ring comprises a plurality of reaction ring segments (220A).

16. The in-situ remedial support bearing arrangement of claim 12, wherein the plurality of strongback assemblies are circumferentially positioned on the reaction ring.

17. The in-situ remedial support bearing arrangement of claim 16, wherein each strongback assembly is connected to the bearing inner ring with a plurality of puller bars (240).

18. The in-situ remedial support bearing arrangement of claim 17, wherein each puller bar comprises a first end (240A) connected to a protruding end of an existing inner ring stud bolt (32) and has a second end (240B) passing through a hole (232A) in the strongback assembly.

19. In an offshore system including a floating vessel having a turret supporting structure, a turret (12) moored to a seafloor, and a bearing assembly (10) interconnecting the turret to the turret supporting structure of the vessel, the bearing assembly including a support row assembly (20) axially transferring the weight of the turret to the vessel and allowing the vessel and the turret supporting structure to weather vane about the turret, a method for in situ remediation of the support row assembly after being damaged, comprising the steps of:
removing an outer upper ring (42) from engagement with an outer lower ring (22);
installing a support ring (202) on the outer lower ring;
installing a lower race (206) and a plurality of support rollers (208) of a remedial support row assembly (200) on the support ring;
positioning a reaction ring (220) above the support ring;
connecting the reaction ring to an inner ring secured to the turret; and
axially displacing the inner ring and turret relative to the outer lower ring and transferring the turret axial loading to the remedial support row assembly between the support ring and the reaction ring.

20. The method of claim 19, further comprising a step of securing the inner ring and turret in the axially displaced position.

21. A remedial support bearing assembly for a damaged support bearing (20) positioned between a turret and a turret supporting structure of a floating vessel and providing vertical load transfer of the turret to the floating vessel, the remedial support bearing assembly comprising:
a circumferential support ring (202) arranged and designed to be connected to the turret supporting structure;
a circumferential reaction ring (220) arranged and designed to be positioned above the support ring;
a remedial support bearing (200) arranged and designed to be positioned between and separating the support ring and the reaction ring; and
a plurality of strongback assemblies (230) arranged and designed to abut a top surface of the reaction ring and be connected to the turret.

22. The remedial support bearing assembly of claim 21, wherein the circumferential support ring comprises a plurality of support ring segments (202A) arranged and designed to be in abutting relation.

23. The remedial support bearing assembly of claim 22, wherein the plurality of support ring segments are arranged and designed to be fastened to the turret supporting structure.

24. The remedial support bearing assembly of claim 21, wherein the circumferential reaction ring comprises a plurality of reaction ring segments (220A).

25. The remedial support bearing assembly of claim 21, wherein the plurality of strongback assemblies are arranged and designed to be circumferentially positioned on the reaction ring.

26. The remedial support bearing assembly of claim 25, further comprising a plurality of puller bars (240), wherein the plurality of strongback assemblies are arranged and designed to be connected to the turret with the plurality of puller bars.

27. The remedial support bearing assembly of claim 26, wherein each puller bar comprises a first end (240A) arranged and designed to be connected to a protruding end of an existing inner ring stud bolt (32) and has a second end (240B) arranged and designed to pass through a hole (232A) in the strongback assembly.

* * * * *